United States Patent [19]

Kobayashi et al.

[11] Patent Number: 4,781,744

[45] Date of Patent: Nov. 1, 1988

[54] MOLDING METHOD

[75] Inventors: Shigeyoshi Kobayashi, Kawasaki; Tsuneo Manabe; Masazumi Shigematsu, both of Yokohama; Yasuko Osaki, Kawasaki; Shoji Watanabe, Tokyo; Tohoru Sema, Yokohama, all of Japan

[73] Assignees: Asahi Glass Company Ltd.; Lion Corporation, both of Tokyo, Japan

[21] Appl. No.: 102,310

[22] Filed: Sep. 25, 1987

Related U.S. Application Data

[63] Continuation of Ser. No. 914,361, Oct. 2, 1986, abandoned.

[30] Foreign Application Priority Data

Oct. 11, 1985 [JP] Japan ................................ 60-224880

[51] Int. Cl.$^4$ .......................... C03B 19/02; C03C 1/04
[52] U.S. Cl. ........................................... 65/33; 65/66; 65/374.13; 249/134; 501/10
[58] Field of Search ................. 65/33, 66, 122, 374.13, 65/374.11; 106/38.9, 38.27, 38.3; 501/10; 249/134; 264/337

[56] References Cited

U.S. PATENT DOCUMENTS

| 2,072,212 | 3/1937 | Moosdorf | 106/38.9 |
| 3,379,541 | 4/1968 | Tuvell | 106/38.27 |
| 4,360,625 | 11/1982 | Griffith | 423/314 |
| 4,366,253 | 12/1982 | Yagi | 501/10 |
| 4,417,912 | 11/1983 | Abe | 501/10 |
| 4,445,565 | 5/1984 | Seeney | 106/38.3 |
| 4,617,279 | 10/1986 | Manabe | 501/10 |
| 4,662,924 | 5/1987 | Kobayashi | 65/66 |
| 4,681,633 | 7/1987 | Watanabe | 501/10 |

FOREIGN PATENT DOCUMENTS

| 346514 | 11/1978 | Austria. | |
| 51-73019 | 6/1976 | Japan | 501/10 |
| 59-64576 | 4/1984 | Japan | 106/38.9 |
| 2087375 | 5/1982 | United Kingdom. | |

OTHER PUBLICATIONS

Webster's New Collegiate Dictionary; G & C Merriam Co., 1960, p. 541.

Primary Examiner—Kenneth M. Schor
Attorney, Agent, or Firm—Oblon, Fisher, Spivak, McClelland & Maier

[57] ABSTRACT

A mold capable of imparting uniform transparency to the calcium phosphate type crystallized glass, in which crystals of calcium metaphosphate are present at the shaping surface of the mold which comes into contact with the material to be shaped.

6 Claims, No Drawings

MOLDING METHOD

This application is a continuation of application Ser. No. 06/914,361, filed on Oct. 2, 1986, now abandoned.

This invention relates to a mold, and, more particularly, it is concerned with a casting mold which can be used for shaping various products such as dental supplies, artificial bones, artificial joints, and so forth by use of calcium phosphate type crystallized glass.

In recent years, various artificial materials have been proposed for the dental supplies, artificial bones, artificial joints, and so forth, some of which have already been put into actual use.

Of these artificial materials, calcium phosphate type material is identical or similar, in its constituent, with or to that of the teeth and the bones of living organisms, so that it has less rejection from the side of the organisms, hence it is favorable for such use.

Of these various materials, calcium phosphate type crystallized glass is excellent in its shaping property; and, in particular, its physical property is very close to that of the natural tooth, so that its application as the dental supplies is highly expected.

As the expedient for obtaining the material, there has so far been adopted such a method, in which the calcium phosphate type material is cast into a magnesium phosphate type mold or a silicate type mold to be shaped and crystallized in it.

In this magnesium phosphate type mold, when the shaping material is molded and crystallized, the resulting calcium phosphate type crystallized glass has non-uniformity in its transparency, on account of which there takes place irregularities in the outer appearance of the glass. On the other hand, when the shaping material is molded and crystallized in a silicate type mold, the resulting calcium phosphate type crystallized glass contains a multitude of crystal nuclei dotted therein, each of these crystal nuclei undergoing crystal growth in all directions to form a large number of radial patterns in their outer appearance. At the same time, there is also brought about an unfavorable state of cavities being created among the crystal nuclei.

In order to avoid such phenomena to take place, attempts have been made as to crystallizing the shaped article outside the mold, not inside the mold, after it is taken out of the mold. According to this method, however, the shaped product is liable to be deformed easily with the consequent difficulty in obtaining the crystallized body having high dimensional precision.

With a view to removing such disadvantages inherent in these conventional methods, the present inventors have made various studies and researches, as the result of which they have found that the principal cause of such disadvantages resided in the composition of the mold, and further that, by causing a particular substance to exist at the shaping surface of such mold, the shaped body could be uniformly crystallized.

It is therefore the primary object of the present invention to provide a mold material of improved properties.

It is another object of the present invention to provide a mold which imparts uniform transparency to the calcium phosphate type crystallized glass.

According to the present invention, in general aspect of it, there is provided a mold for shaping and crystallizing calcium phosphate type glass, characterized in that crystals of calcium metaphosphate are present in the shaping surface of the mold which comes into contact with a material to be shaped.

The foregoing objects, other objects, and specific ingredients for constructing the shaping mold according to the present invention will become more apparent and understandable from the following detailed description thereof with reference to a couple of preferred examples together with a couple of comparative examples.

In the present invention, there is no particular limitation to the base material for the mold, in which the crystals of calcium metaphosphate are present. Appropriate examples of such base material for the mold are: magnesium phosphate, silicate, alumina, ammonium phosphate, zirconia, gypsum, and others.

The quantity of the crystals of calcium metaphosphate to be present in the mold material may be at least 5% by weight, preferably 10% by weight or more, or more preferably from 20 to 50% by weight. And, such calcium metaphosphate should appropriately be present in the mold to a depth of 10 $\mu$m or above, or preferably 100 $\mu$m or above from its surface.

The form of the calcium metaphosphate crystals to be used is in $\beta$-type or $\delta$-type or a mixture of these two types.

In practice, it may be sufficient that such calcium metaphosphate exist in the mold material in the form of crystal at the time of its shaping. For this reason, when the calcium phosphate material is added to the mold materials at the time of its shaping, the material needs not be in the crystal form from the beginning, but it may be in the form of calcium phosphate compound such as calcium phosphate type glass, $CaH_4(PO_4)_2$, and so forth. Such compound is crystallized by heat in the course of molding or crystallizing of the shaping material.

Further, calcium metaphosphate may be present, at least, at the shaping surface of the mold as mentioned in the foregoing, or may be mixed in the entire mold, if it is so desired.

As the method for manufacturing the casting mold according to the present invention, there may be adopted the following: a method, in which crystals of calcium metaphosphate, for example, having an average crystal grain size of 100 $\mu$m or below are mixed in a predetermined quantity with the base material for the mold, and then are cured on the molding surface of a prototype to thereby obtain the casting mold; and a method, in which the base material with the crystals of the above-mentioned calcium metaphosphate having been mixed in it is coated on the shaping surface of the mold which has been prepared in advance. There may also be adopted a method, in which a layer containing therein crystals of calcium metaphosphate is formed on the surface of a prototype (in the case of the lost-wax method, a wax pattern) by application of the layer material with the crystals of the above-mentioned calcium metaphosphate having been mixed, or by immersion of the prototype into such layer material, after which the casting mold is produced.

The larger the grain size of calcium metaphosphate to be mixed, the greater the quantity of calcium metaphosphate to be mixed which is required for obtaining the effect. However, when the crystal grain size of calcium metaphosphate exceeds 100 $\mu$m, no sufficient effect can be developed, even if the adding quantity is increased, but, on the contrary, the surface smoothness of the mold becomes unfavorably poor.

When the calcium metaphosphate type glass in its molten state is to be shaped by use of a casting mold according to the present invention, if the quantity of calcium metaphosphate to be mixed into the casting mold increases, the mold-releasing property of the shaped body becomes poor. In this case, blending of boron nitride, carbon, and so forth in powder form into the mold material along with calcium phosphate powder would be effective for improving the mold-releasing property.

Various examples may be enumerated as the calcium phosphate type glass to be shaped by use of the mold according to the present invention. For instance, the one which consists essentially of 41 to 49.5 mol % of CaO; 58.5 to 50 mol % of $P_2O_5$; and 0.5 to 5 mol % of $Al_2O_3$, with the Ca/P atomic ratio being in a range of from 0.35 to 0.7 (or more particularly, from 0.35 to 0.49) is preferable.

As the means for shaping calcium phosphate glass using the mold according to the present invention, there may appropriately be adopted, for example, the lost-wax method, the press-shaping method, and others which are usually in practice.

Also, there is no particular limitation to the crystallizing means, for which a method of maintaining the shaped body, for instance, in an electric furnace at a temperature of 700° C. for two hours may be adopted.

In the following, the present invention will be explained more specifically with reference to the preferred examples thereof.

EXAMPLE 1

18 g of calcium $\beta$-metaphosphate in powder form (having an average grain size of 5 $\mu$m) was mixed with 50 g of phosphate type embedding material ("BLUE BEST" powder—a product of Tokuyama Soda Co., Ltd., Japan). After sufficient kneading of this mixture with 10 ml of a kneading liquid exclusive for "BLUE BEST", the kneaded mixture was placed in a ring-shaped mold with a wax pattern being provided at the center part thereof, followed by curing the same. The thus obtained mold material was then heated at a temperature of 700° C. for 30 minutes to burn out the wax in the pattern, whereby a mold was formed.

Into the resulted mold, there was cast a molten glass composition consisting of 45 mol % of CaO, 2 mol % of $Al_2O_3$ and 53 mol % of $P_2O_5$, and having a melt temperature of 1,250° C. by centrifugal casting. The cast product together with the casting mold was maintained at 700° C. for five hours, and crystallized thereby.

The thus obtained crystallized glass was seen to have a reaction layer between it and the mold material to a slight extent, but it was found to be uniform in its constitution and semi-transparent, without any defects whatsoever such as bubbles, etc. having been observed.

EXAMPLE 2

A liquid prepared by mixing 2 g of calcium $\delta$-metaphosphate in powder form (having an average grain size of 7 $\mu$m) and 5 g of boron nitride powder with 10 g of an ethyl silicate binder ("HAS-6"- a product of Colcoat Co., Ltd.) was coated around a wax pattern in an average thickness of 200 $\mu$m, followed by drying the same.

The wax pattern, on which the above-mentioned coating had been applied, was provided at the center part of the ring, into which a silicate type embedding material ("HEAT VEST"—a product of Kamemizu Chemical Co., Ltd., Japan) was introduced and cured by a usual method.

The thus obtained mold material was subjected to heat-treatment for 30 minutes at a temperature of 800° C. to burn out the wax in the pattern, whereby the casting mold containing in its surface a layer containing therein the crystals of calcium metaphosphate and having an average thickness of 200 $\mu$m was formed.

Into this casting mold, there was cast the molten glass in the same manner as in Example 1 above, followed by crystallization of it. The thus obtained crystallized glass was found to have good mold-releasing property, to be uniform in its constituent, and to be semi-transparent without any defects whatsoever such as bubbles, etc. having been observed.

COMPARATIVE EXAMPLE 1

The same procedures were followed as in Example 1 above, with the exception that no crystallized powder of calcium $\beta$-metaphosphate was mixed, thereby obtaining the shaped body of the crystallized glass.

The thus obtained shaped body of the crystallized glass was found to have been in white turbidity with the semi-transparent portions having been dotted insularly, hence non-uniform constitution.

COMPARATIVE EXAMPLE 2

The same procedures were followed as in Example 2 above, with the exception that no layer containing therein the crystallized powder of calcium $\delta$-metaphosphate was coated, whereby the shaped body of the crystallized glass was obtained.

The thus obtained shaped body of the crystallized glass, though it was semi-transparent, was found to be non-uniform in its transparency with cavities of approximately 1 to 2 mm in diameter having been formed here and there.

We claim:

1. A method of shaping and crystallizing calcium phosphate glass, comprising:
   preparing a mold, the shaping surface of which is comprised of crystals of $\beta$- or $\delta$-calcium metaphosphate in an amount sufficient to provide uniform crystallization of said glass in said mold;
   feeding a molten calcium phosphate glass melt to said mold; and
   shaping the molten calcium phosphate glass melt which is in contact with the shaping surface of said mold to provide a shaped product, and crystallizing said shaped product while it is hot to thereby provide a crystallized calcium phosphate article.

2. The method according to claim 1, wherein said crystals of calcium metaphosphate are present in a quantity of at least 5 % by weight to a depth of at least 10 $\mu$m from the shaping surface.

3. The method according to claim 1, wherein the base material for the mold is selected from the group consisting of magnesium phosphate, silicate, alumina, aluminum phosphate, zirconia and gypsum.

4. The method according to claim 1, wherein said crystals of calcium metaphosphate have an average grain size of at most 100 $\mu$m.

5. The method according to claim 1, wherein the glass composition shaped in said mold consists essentially of 41 to 49.5 mol % CaO, 58.5 to 50 mol % $P_2O_5$ and 0.5 to 5 mol % $Al_2O_3$, wherein the Ca/P atomic ratio is within the range of from 0.35 to 0.7.

6. The method according to claim 5, wherein said Ca/P atomic ratio is 0.35 to 0.49.

* * * * *